(12) United States Patent  (10) Patent No.: US 7,620,530 B2
Bordes et al.  (45) Date of Patent: Nov. 17, 2009

(54) SYSTEM WITH PPU/GPU ARCHITECTURE

(75) Inventors: Jean Pierre Bordes, St. Charles, MO (US); Curtis Davis, St. Louis, MO (US); Manju Hegde, St. Louis, MO (US)

(73) Assignee: NVIDIA Corporation, Santa Clara, CA (US)

( * ) Notice: Subject to any disclaimer, the term of this patent is extended or adjusted under 35 U.S.C. 154(b) by 231 days.

(21) Appl. No.: 10/988,588

(22) Filed: Nov. 16, 2004

(65) Prior Publication Data

US 2006/0106591 A1  May 18, 2006

(51) Int. Cl.
G06F 7/60 (2006.01)

(52) U.S. Cl. ............... 703/2; 703/6; 706/10; 708/446; 709/217; 709/218; 709/236; 709/238

(58) Field of Classification Search ............ 712/11, 712/16, 32; 463/1, 30–38, 43; 345/501–522; 703/2, 6; 709/217, 218, 236, 238; 708/446; 706/10
See application file for complete search history.

(56) References Cited

U.S. PATENT DOCUMENTS

| | | | |
|---|---|---|---|
| 4,116,444 A | 9/1978 | Mayer et al. | |
| 4,209,832 A | 6/1980 | Gilham et al. | |
| 4,824,106 A * | 4/1989 | Ueda et al. ............... | 463/33 |
| 4,862,156 A | 8/1989 | Westberg et al. | |
| 4,871,167 A | 10/1989 | Pasierb, Jr. | |
| 4,905,147 A | 2/1990 | Logg | |
| 4,905,168 A | 2/1990 | McCarthy et al. | |
| 5,187,796 A | 2/1993 | Wang et al. | |
| 5,224,213 A | 6/1993 | Dieffenderfer et al. | |
| 5,308,086 A | 5/1994 | Ueda et al. | |
| 5,425,139 A | 6/1995 | Williams et al. | |
| 5,455,902 A | 10/1995 | Ellson et al. | |
| 5,487,172 A | 1/1996 | Hyatt | |
| 5,522,082 A | 5/1996 | Guttag et al. | |
| 5,664,162 A | 9/1997 | Dye | |
| 5,680,534 A * | 10/1997 | Yamato et al. ............... | 345/473 |
| 5,708,457 A | 1/1998 | Otake et al. | |
| 5,721,834 A | 2/1998 | Milhaupt et al. | |
| 5,771,167 A | 6/1998 | Gomi et al. | |
| 5,812,147 A | 9/1998 | Van Hook et al. | |
| 5,828,369 A | 10/1998 | Foster | |
| 5,841,444 A | 11/1998 | Mun et al. | |
| 5,938,530 A * | 8/1999 | Watanabe ............... | 463/31 |
| 5,966,528 A | 10/1999 | Wilkinson et al. | |
| 6,008,818 A | 12/1999 | Amakawa et al. | |
| 6,058,465 A | 5/2000 | Nguyen | |
| 6,105,119 A * | 8/2000 | Kerr et al. ............... | 711/219 |

(Continued)

Primary Examiner—Kamini S Shah
Assistant Examiner—Kibrom K Gebresilassie
(74) Attorney, Agent, or Firm—Patterson & Sheridan, LLP (57) ABSTRACT

A PPU-enhanced computer system is provided including a Physics Processing Unit (PPU), a Graphics Processing Unit (GPU), a Central Processing Unit (CPU) and a main memory, wherein the system creates an animation from application data stored in the main memory by data communication between the GPU, PPU, CPU and main memory. The system may include a memory controller and a chip set connecting the bus structure to the CPU and GPU through an I/O interface and connecting the PPU though a bus structure. The PPU may be a separate processing core logically grouped with the CPU and GPU processing cores. In this preferred embodiment, the CPU, GPU and PPU receive data from a common L2 cache and/or a main system memory.

21 Claims, 7 Drawing Sheets

U.S. PATENT DOCUMENTS

| | | | |
|---|---|---|---|
| 6,115,036 A * | 9/2000 | Yamato et al. | 715/723 |
| 6,154,186 A * | 11/2000 | Smith et al. | 345/1.2 |
| 6,240,526 B1 | 5/2001 | Petivan et al. | |
| 6,298,370 B1 * | 10/2001 | Tang et al. | 718/102 |
| 6,341,318 B1 | 1/2002 | Dakhill | |
| 6,342,892 B1 | 1/2002 | Van Hook et al. | |
| 6,414,687 B1 * | 7/2002 | Gibson | 345/503 |
| 6,425,822 B1 | 7/2002 | Hayashida et al. | |
| 6,514,142 B1 | 2/2003 | Hattori et al. | |
| 6,553,446 B1 | 4/2003 | Miller | |
| 6,570,569 B1 | 5/2003 | Tsukamoto et al. | |
| 6,570,571 B1 | 5/2003 | Morozumi | |
| 6,580,430 B1 | 6/2003 | Hollis et al. | |
| 6,629,891 B2 | 10/2003 | Nagayama | |
| 6,646,653 B2 | 11/2003 | San et al. | |
| 6,714,901 B1 | 3/2004 | Cotin et al. | |
| 6,782,432 B1 | 8/2004 | Nelson et al. | |
| 6,917,443 B1 | 7/2005 | Wang | |
| 6,966,837 B1 | 11/2005 | Best | |
| 7,006,085 B1 | 2/2006 | Acosta et al. | |
| 7,095,416 B1 * | 8/2006 | Johns et al. | 345/522 |
| 7,119,817 B1 | 10/2006 | Kawakami | |
| 7,120,653 B2 * | 10/2006 | Alfieri et al. | 707/204 |
| 7,229,355 B2 | 6/2007 | San et al. | |
| 7,363,199 B2 | 4/2008 | Reynolds et al. | |
| 7,372,463 B2 | 5/2008 | Anand | |
| 7,372,472 B1 | 5/2008 | Bordeleau et al. | |
| 7,432,932 B2 * | 10/2008 | San et al. | 345/501 |
| 2001/0030648 A1 | 10/2001 | Deering | |
| 2001/0040577 A1 | 11/2001 | San et al. | |
| 2001/0043224 A1 | 11/2001 | San et al. | |
| 2001/0055035 A1 | 12/2001 | Kinjo | |
| 2002/0050999 A1 * | 5/2002 | San et al. | 345/530 |
| 2002/0183992 A1 | 12/2002 | Ayache et al. | |
| 2003/0032467 A1 | 2/2003 | Mayer et al. | |
| 2003/0090484 A1 | 5/2003 | Comair et al. | |
| 2003/0112281 A1 | 6/2003 | Sriram et al. | |
| 2003/0177187 A1 | 9/2003 | Levine et al. | |
| 2004/0075623 A1 * | 4/2004 | Hartman | 345/1.3 |
| 2004/0085321 A1 * | 5/2004 | Oka et al. | 345/501 |
| 2005/0041031 A1 * | 2/2005 | Diard | 345/505 |
| 2005/0071306 A1 | 3/2005 | Kruszewski et al. | |
| 2005/0075154 A1 * | 4/2005 | Bordes et al. | 463/1 |
| 2005/0075849 A1 * | 4/2005 | Maher et al. | 703/2 |
| 2005/0086040 A1 * | 4/2005 | Davis et al. | 703/22 |
| 2005/0165873 A1 * | 7/2005 | Zhang et al. | 708/446 |
| 2005/0165874 A1 * | 7/2005 | Zhang et al. | 708/446 |
| 2005/0225552 A1 * | 10/2005 | Anand | 345/473 |
| 2005/0272492 A1 * | 12/2005 | Stelly, III | 463/1 |
| 2006/0030383 A1 | 2/2006 | Rosenberg et al. | |
| 2006/0092175 A1 | 5/2006 | Mech | |
| 2006/0100835 A1 * | 5/2006 | Bordes et al. | 703/3 |
| 2006/0149516 A1 * | 7/2006 | Bond et al. | 703/6 |
| 2007/0030276 A1 | 2/2007 | MacLnnis et al. | |
| 2007/0035543 A1 | 2/2007 | David et al. | |
| 2007/0057943 A1 | 3/2007 | Beda et al. | |
| 2007/0071312 A1 | 3/2007 | Gardella et al. | |
| 2008/0049030 A1 | 2/2008 | Kaslin | |
| 2008/0055321 A1 * | 3/2008 | Koduri | 345/505 |
| 2008/0074425 A1 | 3/2008 | Ohba et al. | |
| 2008/0100627 A1 | 5/2008 | Nystad et al. | |

* cited by examiner

SYSTEM WITH PPU/GPU ARCHITECTURE

This application is related to commonly-assigned U.S. patent application Ser. No. 10/715,440 filed Nov. 19, 2003. The subject matter of this related application is hereby incorporated by reference.

BACKGROUND OF THE INVENTION

The present invention relates generally to systems running applications that benefit from the incorporation of physics-based animations or physics data. More particularly, the present invention relates to Physics Processing Unit (PPU) enhanced systems incorporating a Graphics Processing Unit (GPU).

PPU enhanced systems have recently been developed. Systems readily adapted to PPU enhancement include, as examples, Personal Computers (PCs) and game consoles. Generally speaking, the performance capabilities of a conventional Central Processing Unit (CPU), such as a Pentium® or similar microprocessor, is enhanced by the additional provision of a PPU. Several exemplary embodiments of basic, PPU-enhanced system are disclosed in above referenced U.S. patent application.

The term "PPU-enhanced" generally describes any system incorporating a PPU to generate physics data for consumption by a main application running on a CPU. "Physics data" comprises any data or data structure related to a mathematical algorithm or logical/mathematical expression adapted to solve a physics problem or express a physics relationship.

Any set of logical computations or algorithms operating upon physics data is termed a physics "simulation." A simulation generally runs on the PPU in cooperation with the CPU to generate a body of physics data that accurately defines the movement and/or interaction of objects and features in an animated scene displayed by a peripheral device associated with the system. So, in one sense the physics simulation run primarily on the PPU can be said to visually enhance the animation of a scene generated by the main application running on the CPU.

Such computationally derived physical animations form an increasingly important aspect of numerous applications. Computer games are an excellent example of applications that benefit from the added realism of animations derived from a defined set of physics-based inputs, parameters, and data. The term "animation" is used here to generally describe any visual representation of an event. The term "physics-based animation" refers to any animation derived, at least in part, from data provided by a physics simulation. A simulation is often said to drive the resulting animation. However, the direct relationship between simulation and animation, and the fact that the underlying simulation is not apparent to the system user typically results in an alternative use for the terms animation and simulation.

Cutting edge applications generally demand that physics-based animations, and the underlying simulations run in real-time. This requirement poses a significant problem for conventional systems. For example, conventional PCs are able to resolve only a limited amount of physics data in the time allowed by real time animation frame rates. This disability arises from structural limitations in the CPU architecture, data transfer bandwidth limitations, and the computational workload placed upon the CPU by other processes inherent in the execution of the main application.

For clarity of reference, the term "system" subsumes the term "host system." A system may include a PPU, whereas the term "host system" generally refers to the combination of at least a CPU and an associated main memory. This combination of "host system" elements interacts with the PPU in a system.

Host systems almost always include a GPU. That is, many contemporary applications include significant graphics content and are intended to run with the aid of a separate GPU. GPUs are well know in the industry and are specifically designed to run in cooperation with a CPU to create (or "render") animations having a three dimensional (3-D) quality.

PPU enhancement of a system implicates a number of changes in the way data is transferred between various system components. Non-PPU-enhanced systems have the luxury of a single computational platform (e.g., the CPU) generating data for consumption by a GPU. This is not the case in a PPU-enhanced system. Thus, new approaches to overall system architecture are required. Related data transfers must also be carefully considered.

SUMMARY OF THE INVENTION

In one aspect, the present invention provides a PPU-enhanced system in which animation data is efficiently generated using the computational resources provided by either the CPU or the PPU. As a result, CPU resources are made available for other tasks associated with the execution of an application.

In a related aspect, data is transferred in a system comprising a CPU and a main memory connected within the system through a chip set. A GPU and PPU may be connected within the system through a local bus, such as a PCI bus.

Animation data used by the GPU to render a scene on a display device is preferably stored in a GPU memory adapted to receive animation data from the main memory, or optionally, directly from PPU memory.

In yet another related aspect, the system provided by the present invention may connect the PPU and GPU though a single local bus or multiple buses. In one preferred embodiment the GPU is connected though a high bandwidth bus, such as an Accelerated Graphics Port (AGP) bus, and the PPU is connected through a PCI or PCI express bus.

In another aspect, the present invention provides a system comprising a processor. The processor comprises a CPU and a GPU connected to an L2 cache and a bus interface, a Input/Output (I/O) interface connected to the bus interface, and a memory controller connected to the bus interface. The system also comprises a main memory connected to the processor through the memory controller, a chip set connecting a local bus to the processor through the I/O interface, and a PPU connected within the system through the local bus.

In still another aspect, the present invention provides a system comprising a processor like the one described above, except for the addition of another data processing element (or core) implementing the PPU. That is, the PPU is pulled into the processor as a separate processing core logically grouped with the CPU and GPU processing cores. In this preferred embodiment, the CPU, GPU, and PPU receive data from a common L2 cache and/or a main system memory.

The present invention further provides a method of rendering an animation in a system like any ones described herein. The method preferably comprises storing application data in the main memory, transferring simulation data from the main memory to a memory associated with the PPU, running a physics simulation on the PPU in relation to the simulation data, returning physics data from PPU memory to the main memory, transferring animation data from the main memory to a memory associated with the GPU, and rendering the animation in relation to the animation data stored in GPU memory.

The present invention still further provides a method of rendering an animation on a display device associated with a system like the ones described herein in which the CPU generates a first portion of the animation while the PPU is generating physics data. At least the first portion of the animation data is stored in memory and the animation is rendered by the GPU using the animation data. The physics data may be a second portion of the animation data, or be used by the CPU to generate a second portion of the animation data.

BRIEF DESCRIPTION OF THE DRAWINGS

The drawings, taken together with the foregoing discussion, the incorporated references, and the detailed description that follows describe several preferred embodiments of the present invention. The drawings include the following.

DETAILED DESCRIPTION OF THE PREFERRED EMBODIMENT(S)

The present invention extends the former recognition that conventional software-based solutions to physics simulations have limits that affect their practical usefulness within the execution of emerging applications. Graphics-intensive applications, such as PC and console games, benefit greatly from the real-time incorporation of many more active objects and features (hereafter "object/features") and related forces than can be reasonably simulated using specialty software run on a general purpose CPU.

Accordingly, the present invention approaches the problem of generating complex, visually realistic animations, and therefore executing the underlying software components—both graphics related and physics related—from an entirely different perspective. Unlike conventional solutions, the present invention preferably relies on a hardware-based Physics Processing Unit (PPU). This additional hardware may be provided by a separate processing unit connected within the system via a local bus, or by a separate processing core provided in a multi-core processing unit. However configured, and in cooperation with the CPU provided by a host system, the PPU provides the enormous, additional, and highly specialized processing capabilities required to implement complex, real-time, physics-enhanced applications and render the associated graphics.

The additional computation capabilities provided by the PPU may be applied to the generation of "animation data" as well as "physics data." The general computation and transfer of physic data, as well as the instruction programming necessary to execute related physics subroutines within a PPU-enhanced system, have been described in various exemplary embodiments contain in commonly assigned U.S. patent applications Ser. Nos. 10/982,791 and 10/982,764 concurrently files on Nov. 8, 2004. The subject matter of these applications is hereby incorporated by reference.

The terms "animation data" and "physics data" are used to distinguish potential differences inherent in the generation and transfer of various data types within the system. In some circumstances, physics data and animation data are directly related one to another. In other circumstances, physics data and animation data are completely unrelated. Thus, the distinction between these two data types is meant to be descriptive rather than limiting.

Generally speaking, animation data defines the visual representation of object/features in a scene as rendered by the GPU. Animation data includes, for example, data defining the position, orientation, and/or movement of object/features in the scene. Animation data also includes data defining the shape of deformable object/features (e.g., soft objects, cloth, fluid, smoke, vegetation, etc.). Several aspects related to the generation and use of animation data within a PPU-enhanced system will be described in the context of a "fluid" example. The fluid object/feature may take the form of an animated body of water for instance.

Like many deformable bodies, the shape of a fluid object/feature is conventionally defined by a mesh of geometric shapes, such as triangles or polygons. A triangle mesh is assumed for purposes of this description. As is conventionally understood, the triangle mesh is defined by an array of vertex data, each vertex data element corresponding to the position of one point of a constituent triangle in the mesh, and/or data identifying vertices that form the individual triangles. These two forms of data are generally referred to as the "vertex buffer" and "index buffer", respectively. The body of "vertex data" defines a field of (visually) small, interconnected triangles which define the frame-by-frame shape of the fluid object/feature. Vertex data is an excellent example of animation data, since such data structures are conventionally used by the GPU to render the associated object/feature in an animation scene.

In a conventional system, CPU resources are used to calculate the movement of fluid object/feature on a frame-by-frame basis. Movement of the object/feature is really determined by calculating the re-positioning and/or re-orientation of the individual vertexes forming the vertex mesh defining fluid object/feature. As can be imagined, calculating the movement of the fluid object/feature requires a considerable number of calculations. In conventional systems, this vast multiplicity of computations must compete with every other computational requirement placed on the CPU by the main application. However, as presently preferred in a PPU-enhanced system, the great bulk of these computations are exported from the host system to the PPU.

As will be described in some additional detail below, physics data generated by the PPU may be used, either directly or indirectly (i.e., with some intervening additional processing provided by the host system), to generate some forms of animation data. As a result, much of the burden associated with the generation of animation data may be shifted from the host system to the PPU. Indeed, the PPU is generally much better adapted to the execution of the numerous computations required to generate certain forms of animation data. By using the PPU to generate certain types of animation data, such data is more rapidly and efficiently generated within the system, and CPU resources are freed up to address other demands made of the application.

A principal object of many emerging applications is the real-time rendering of highly realistic animations responsive to a user's input or direction. PC and console games are ready examples of this broad class of applications. The visual display of 3-D graphics is accomplished by means of three (3) related processing stages: tessellation, geometry, and rendering. These processing stages are implemented in a sequence of pipelined instruction executions and resulting data transfers. In the tessellation stage, objects/features are decomposed into geometric primitives (e.g., triangles and/or polygons) for simplified processing. During the geometry stage tessellated object/features are transformed. Transformation is a generic term describing a process typically characterized by a sequence of complex mathematical operations, such as translating, rotating, and projecting. The rendering stage rasterizes the geometrically manipulated primitives into display pixels and applies certain visual effects to the pixel data, such as texture mapping, Z-buffering, depth cueing, anti-aliasing, and MIP mapping.

Conventional 3-D graphics pipelines are implemented using the combined resources of a CPU and GPU. That is, the computational resources (e.g., the floating-point units) provided by the CPU are generally applied to the tessellation and geometry stages. Rendering has traditionally been accomplished using GPU resources, although recent trends have seen the operations associated with the geometry stage exported from the CPU to the GPU.

In a PPU-enhanced system, PPU resources may be used to execute the many, if not all, of underlying computational operations typically required in the tessellation and geometry stages of an animation process. The actual use or involvement of the PPU in the tessellation and geometry stages of an animation process will of coarse vary by design and in accordance with system priorities. However, certain presently preferred PPU uses and related guidelines for PPU uses are described below.

The use of a PPU in the tessellation and geometry stages of an animation process is likely to vary by object/feature type. For example, nearly all of the computational operations associated with the tessellation and geometry stages of a deformable object/feature animation are preferably performed using PPU resources. Whereas, the geometry stage-related operations of translation, rotation, and projection, as applied to rigid bodies, are preferably performed using GPU and/or CPU resources. This having been said, the forces and torques acting upon rigid bodies are preferably calculated using PPU resources. Once such "force-related" physics data is calculated by the PPU, the PPU then calculates the new translation and rotation of rigid bodies. Then, the translation and rotation data is transferred to the host system and used by the CPU or GPU to translate and rotate rigid bodies associated with a current animated frame.

Before continuing with a discussion of PPU involvement with the generation and transfer of animation data several exemplary hardware embodiments will be described. A first exemplary embodiment of a hardware architecture defined in relation to the present invention is shown in FIG. 1.

Figure 1:
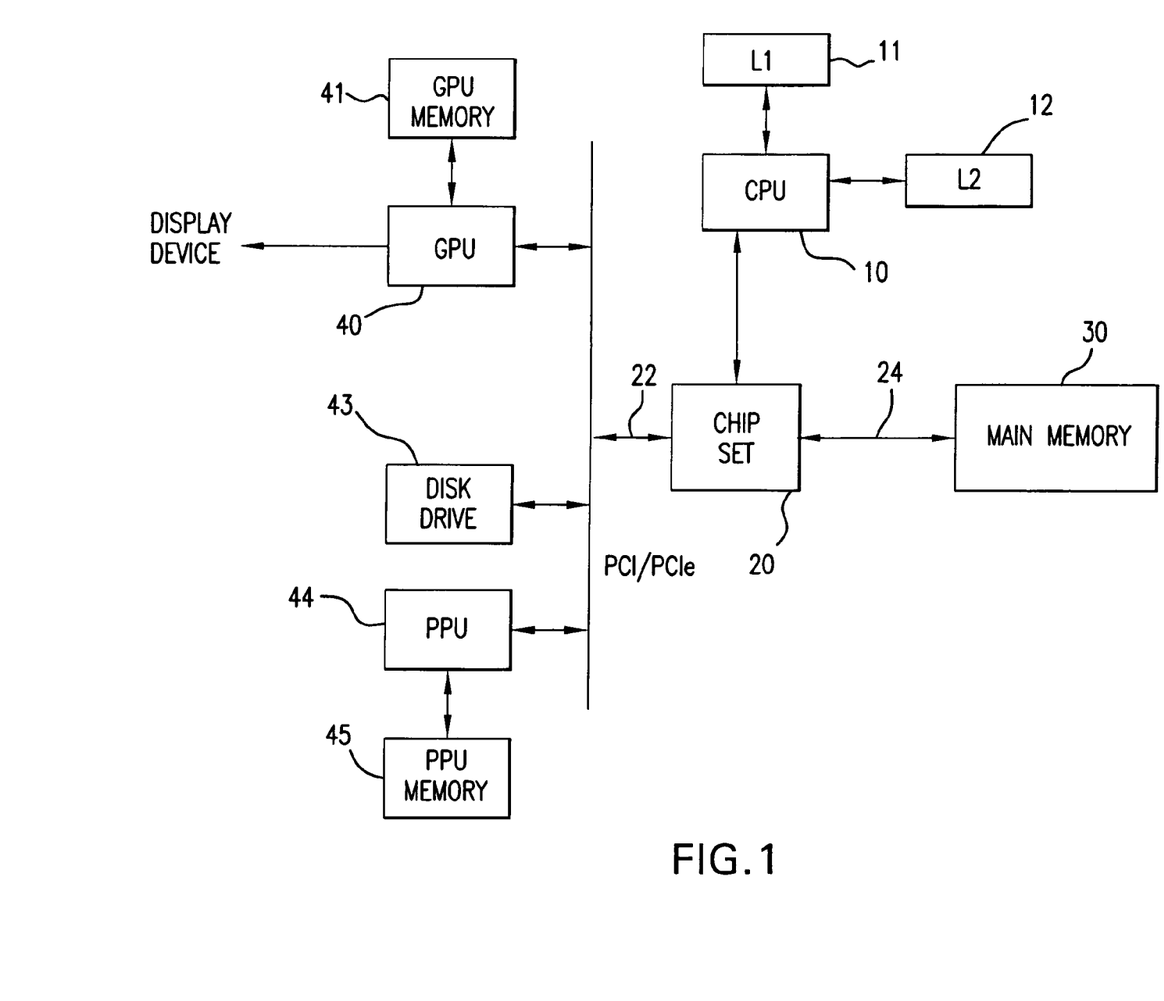
FIG. 1 is a block diagram illustrating one embodiment of the present invention.

Data from a main application is generally provided to the system shown in FIG. 1 via programmable storage media (e.g., a CD) associated with a system peripheral, such as disk drive 43. Disk drive 43, like any number of other peripheral devices, is connected within the system via a local bus (e.g., a PCI or PCI express bus) 22. Thus, data related to the application (hereafter "application data") is generally transferred from disk drive 43 via local bus 22 to main system memory 30 under the control of a chip set 20 as commanded by CPU 10. Chip set 20 preferably comprises or is configured with at least one memory controllers (not shown), such as DMA controller, and at least one PCI bridge (or PCI Express root complex).

In a conventional system, some portion of the application data transferred to main memory 30 is subsequently transferred from main memory 30 and loaded into L1 cache 11 and/or L2 cache 12 preparatory to the execution of instructions and operations by CPU 10. In a conventional system, the CPU is the sole computational platform for generating physics data, animation data, etc.

However, in a PPU-enhanced system, some portion of the application data is physics simulation data, (e.g., data related to computational operations performed by the PPU). Simulation data is transferred by chip set 20 from main memory 30 via the local bus 22 to a PPU memory 45 associated with PPU 44. (Hereafter, PPU memory 45 will not be shown in the drawings, but is assumed as part of an overall "PPU system" generally indicated as PPU 44). PPU 44 thereafter performs computational operation(s) related to the physics data.

As has been noted above and will be described in greater detail hereafter, the PPU is capable of generating both physics data and animation data. Animation data is data ready for consumption by the GPU. All other data returned by the PPU to the host system is generally termed "physics data." The "generation" of both physics data and animation data is accomplished by the execution of one or more logical and/or mathematical operations. These logical and mathematical operations generally calculate the changing relationships of animated object/features in a time-wise progression of frames. The GPU renders the animation on a display device on a frame-by frame basis in response to animation data derived directly from the PPU, animation data derived solely within the host system, and/or animation data derived in the host system based, wholly or in part, upon physics data derived from the PPU.

Accordingly, physics data and/or animation data resulting from the PPU-executed computational operations is typically returned to main memory 30. Animation data stored in main memory 30 is subsequently transferred from main memory to GPU memory 41. Direct Memory Access (DMA) operations are preferably used to transfer: application data from a peripheral to main memory 30; simulation data from main memory 30 to PPU memory 45; and, animation data from main memory 30 to GPU (video) memory 41.

In the example shown in FIG. 1, all data transfers to/from main memory 30 take place over local bus 22. The computation of physics and/or animation data by the PPU increases the overall computational efficiency of the system. Use of a single local bus structure 22 provides a straight-forward connection for various devices like the GPU, PPU, and disk drive, as well as a sound card and similar peripherals operatively connected to the CPU and main memory. Data transfers via chip set 20 are similarly straight-forward and only one data communications protocol need be incorporated within the system's operating parameters.

Figure 2:
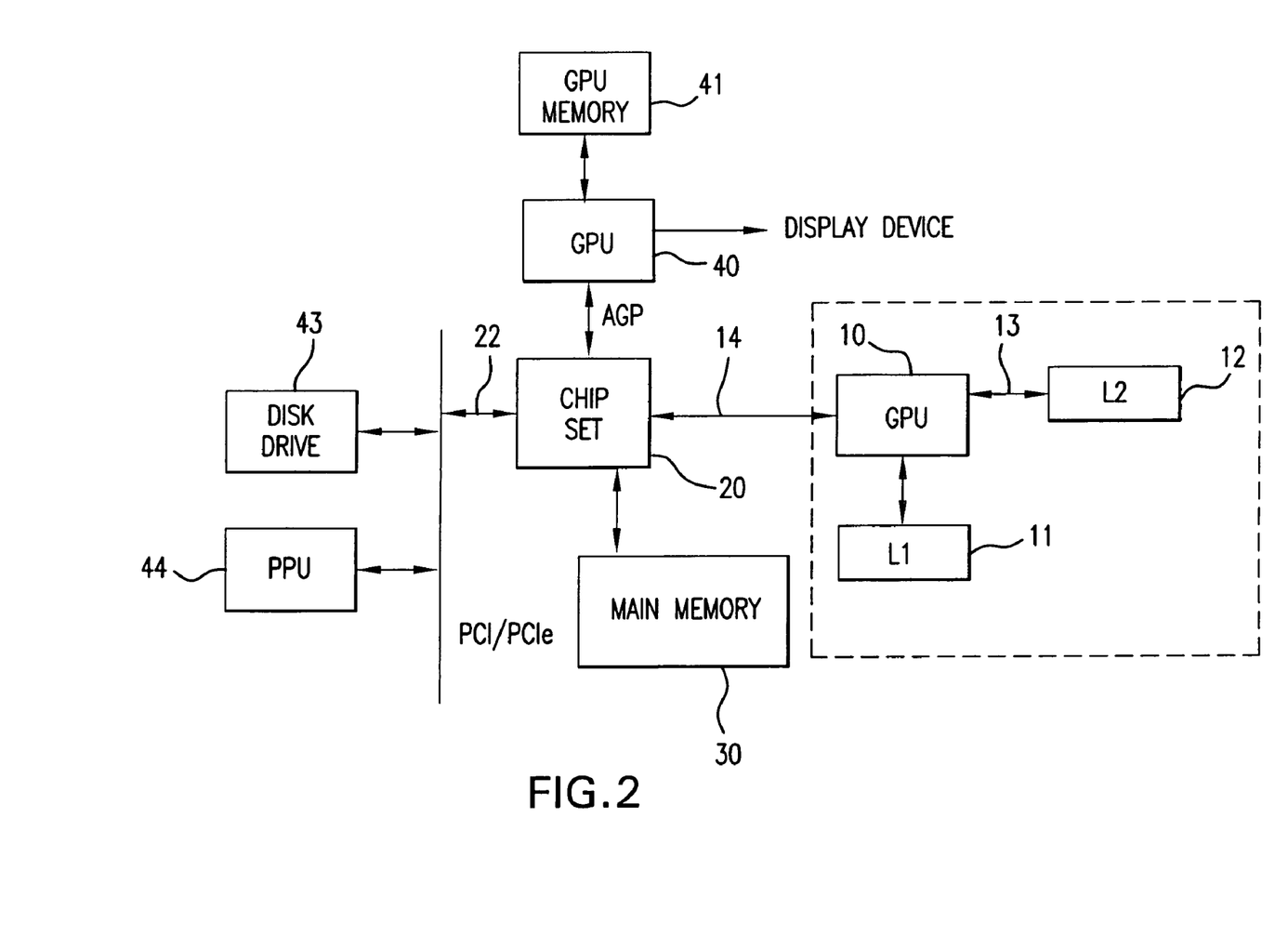
FIG. 2 is a is a block diagram illustrating another embodiment of the present invention.

However, emerging systems often benefit from the incorporation of one or more additional data transfer mechanisms. FIG. 2 shows another exemplary embodiment of the present invention in which GPU 40 and it associated GPU (video) memory 41 are connected within the system via a dedicated, high-speed, Accelerated Graphics Port (AGP) bus instead of local bus 22. This adaptation of the exemplary system shown in FIG. 1 helps remediate the inevitable bus contention issues inherent in the connection of multiple peripheral devices to a single local bus 22. Further, use of an AGP or similar bus, increases the data transfer bandwidth between main memory 30 and GPU memory 41, as compared with local bus architectures like those provided by PCI standards.

Further improvements in the system's overall computational efficiency are provided by an improved CPU architecture, such as that provided by Pentium® II type processors. Within FIG. 2, CPU 10 is coupled to an integrated L2 cache 12 via a back-side bus 13. Back-side bus 13 operates independently from the front-side bus 14 connecting CPU 10 within the system.

There are a number of difficult issues that must be addressed in both of the foregoing architectures. One issue relates to the efficient use of memory resources and the transfer of data between the plurality of memories within the system. That is, the system of FIG. 1, while straight-forward in its implementation, nonetheless suffers from an inefficient use of memory resources. For example, redundant copies of textures maps, a common form of CPU derived animation data, are typically maintained in both main memory 30 and GPU memory 41. GPU memory 41, which tends to be more expensive than main memory 30, is conventionally dedicated to the exclusive use of GPU 40 and can not be directly accessed by other processing elements, such as CPU 10 or PPU 44.

In systems where direct data transfers between PPU memory 45 and GPU memory 41 are not available, animation data stored in PPU memory 45 following the completion of PPU computations may be rapidly prefetched using main memory 30 as a transfer point. That is, animation data is transferred from PPU memory 45 to main memory 30 and thereafter transferred from main memory 30 to GPU memory 41. Alternatively, however, the delay and inefficiency inherent in such two-stop data transfers may be eliminated by a direct transfer of animation data from PPU memory 45 to GPU memory 41.

There are certainly instances where direct animation data transfers from the PPU memory 45 to GPU memory 41 are not possible. As noted above, some physics data generated by the PPU requires additional processing by the CPU in order to generate animation data. In such instances, some or all of the PPU generated physics data must first be transferred to either main memory 30 or a data cache associated with CPU 10.

The dedicated AGP bus provided by the embodiment shown in FIG. 2 permits GPU 40 to directly access animation data stored in main memory 30 during the rendering stage of the animation process, rather than forcing a prefetch of animation data between main memory 30 and GPU memory 41. Unfortunately, issues related to data transfer bottlenecks remain, albeit to a lesser degree than those associated with the system of FIG. 1.

Figure 3:
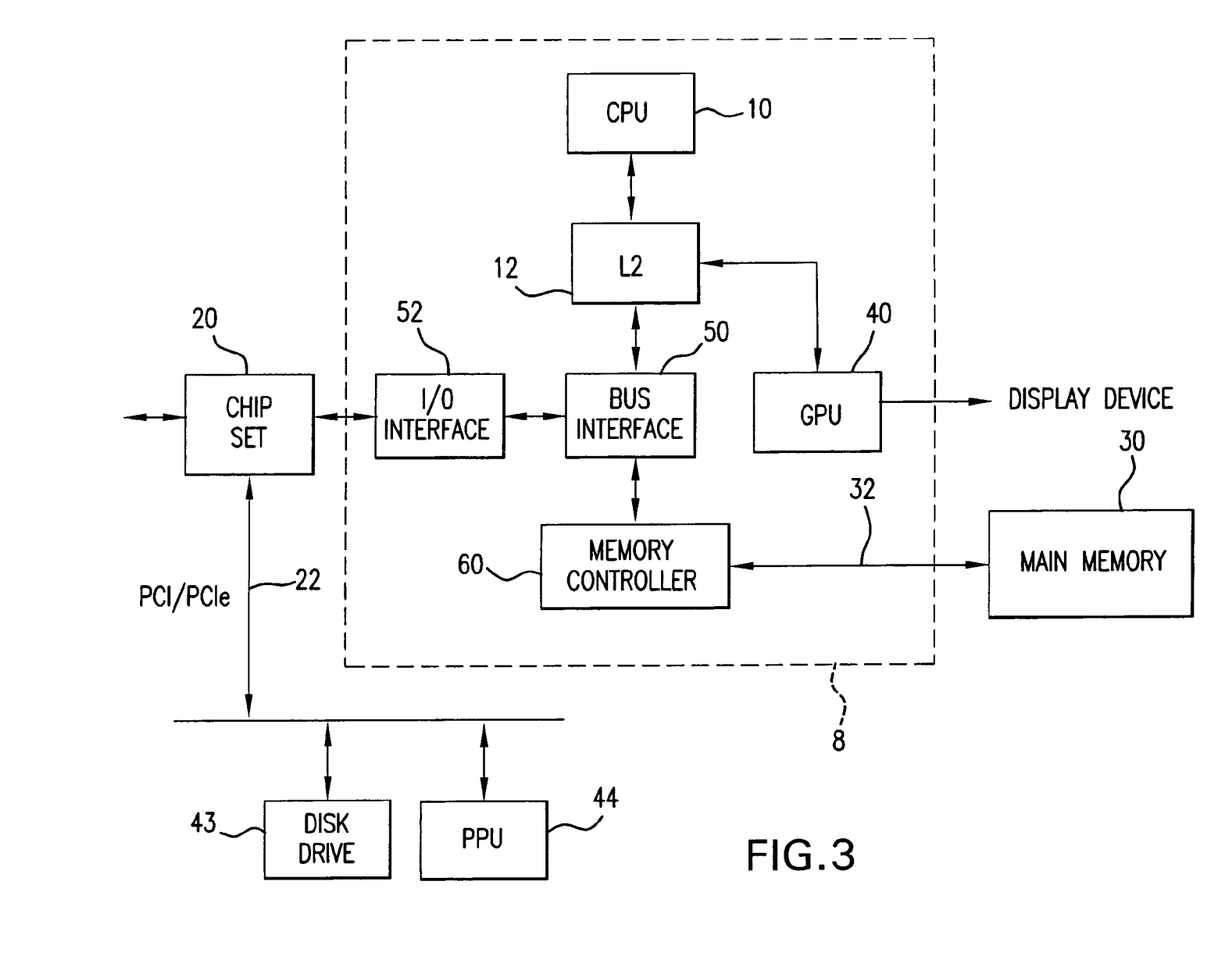
FIG. 3 is a is a block diagram illustrating yet another embodiment of the present invention.

Recent attempts to address data bottlenecking and to reduce the need for prefetching animation data to a GPU memory have resulted in the design of highly integrated, multimedia processors, preferably formed on a unitary silicon die. An exemplary block level diagram of such a processor 8 is shown in FIG. 3. Here, a CPU 10 having integer and floating-point units and associated register files is combined with an Input/Output (I/O) interface 52, a bus interface 50, a memory controller 60, an L2 cache 12, and an integrated GPU 40. Bus interface 50 provides a data communication path between L2 cache 12/CPU 10 and I/O interface 52, memory controller 60 and GPU 40. I/O interface 52 preferably provides a fast interface between processor 8 and chip set bridge 20. Further, CPU 10 preferably shares a single bus connection with L2 cache 12 to bus interface 50. Hence, FIG. 3 logically depicts requests to CPU 10 as running through L2 Cache 12.

Chip set 20 supplies a local (e.g., PCI) connections to system peripherals, including, for example, disk drive 43 and PPU 44. A sound card, a LAN controller, a fast serial link (e.g., a IEEE 1394 "firewire" bus), and/or relatively slow I/O ports for peripherals such as a keyboard and mouse may also be conventionally connected to processor 8 through chip set 20.

Memory controller 60 bridges processor 8 to main memory 30 and may provide data compression/decompression to reduce the bandwidth of traffic crossing over memory bus 31. Main memory 30 and memory controller 60 preferably implement one or more RAMBUS, fast SDRAM, DDR, of GDDR type protocol(s). GPU 40 preferably provides at least TFT, DSTN, RGB, or similar type video output to an external display device.

The system of FIG. 3 is distinct from the systems shown in FIGS. 1 and 2 in that the graphics unit (generally indicated as GPU 40) accesses data directly from the same cache as CPU 10, rather than requiring a separately provided GPU memory. Such an architecture creates some complex arbitration and cache space allocation issues, but these can be solved by conventional techniques. See, for example, U.S. Pat. No. 6,801,207 and references cited therein.

Within the context of a PPU-enhanced system like the one shown in FIG. 3, PPU 44 may effectively transfer data to the host system whether such data is intended for consumption by CPU 10 or GPU 40. As presently preferred, PPU 40 will return data via local bus 22 to main memory 30. Thereafter, the PPU generated physics data and/or animation data may be transferred to L2 cache 12 for consumption by CPU 10 and/or GPU 40. In this manner, data transfer operations may be stream-lined between the host system and PPU. It is also possible that highly critical, physics data generated by the PPU may be directly returned to L2 cache 12 for immediate consumption.

Figure 4:
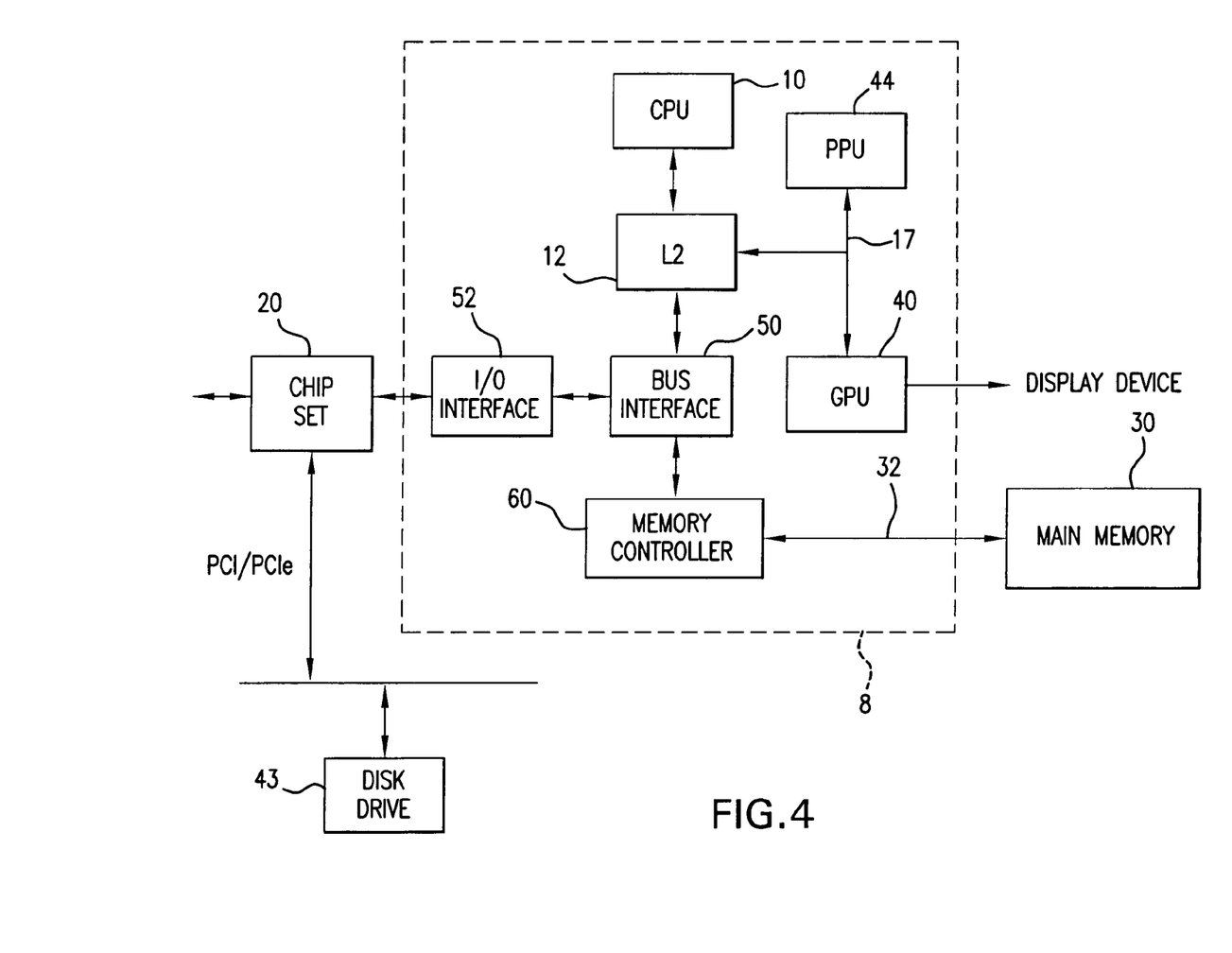
FIG. 4 is a block diagram illustrating still another embodiment of the present invention; and, FIG. 5 is a block diagram illustrating still another embodiment of the present invention; and, FIGS. 6, 7, and 8 are partial flowcharts illustrating data transfer operations related to selected, exemplary operations within a system

FIG. 4 illustrates yet another embodiment of the present invention. This embodiment recognizes the current trend towards multiple processing cores within a single processor chip. According to this trend, instead of using a separate PPU processor and associated memory connected to the host system as a peripheral via a local bus, the embodiment shown in FIG. 4 incorporates the PPU processor as an additional processing core within processor 8. In the illustrated configuration, a separate PPU memory 45 is not necessary and PPU 44 reads/writes data directly from/to the main memory 30 and/or L2 cache 12. However, in a further variation of this architecture, the PPU may be associated with a dedicated, directly-connected external memory (not shown).

With three separate processing cores accessing data from one or more common data caches and/or main memory 30 considerable attention must be paid to potential problems of bus contention and data integrity. For example, a hierarchal cache configuration is almost certainly necessary with this architecture. The hierarchal cache configuration preferably includes a cache controller and shared bus 17 connecting CPU 10, GPU 40, and PPU 44 through L2 cache 12 with bus interface 50. In conjunction with memory controller 60, bus interface 50 fills L2 cache 12 from main memory 30.

The L2 cache will preferably include several designated portions respectively assigned to the exclusive use of a corresponding processing unit (e.g., the CPU, GPU or PPU). Conventional sand-box partitioning, set associated swap areas, or similar techniques, together with conventional bus contention resolution techniques may be used to implement and control the hierarchical cache configuration.

Figure 5:
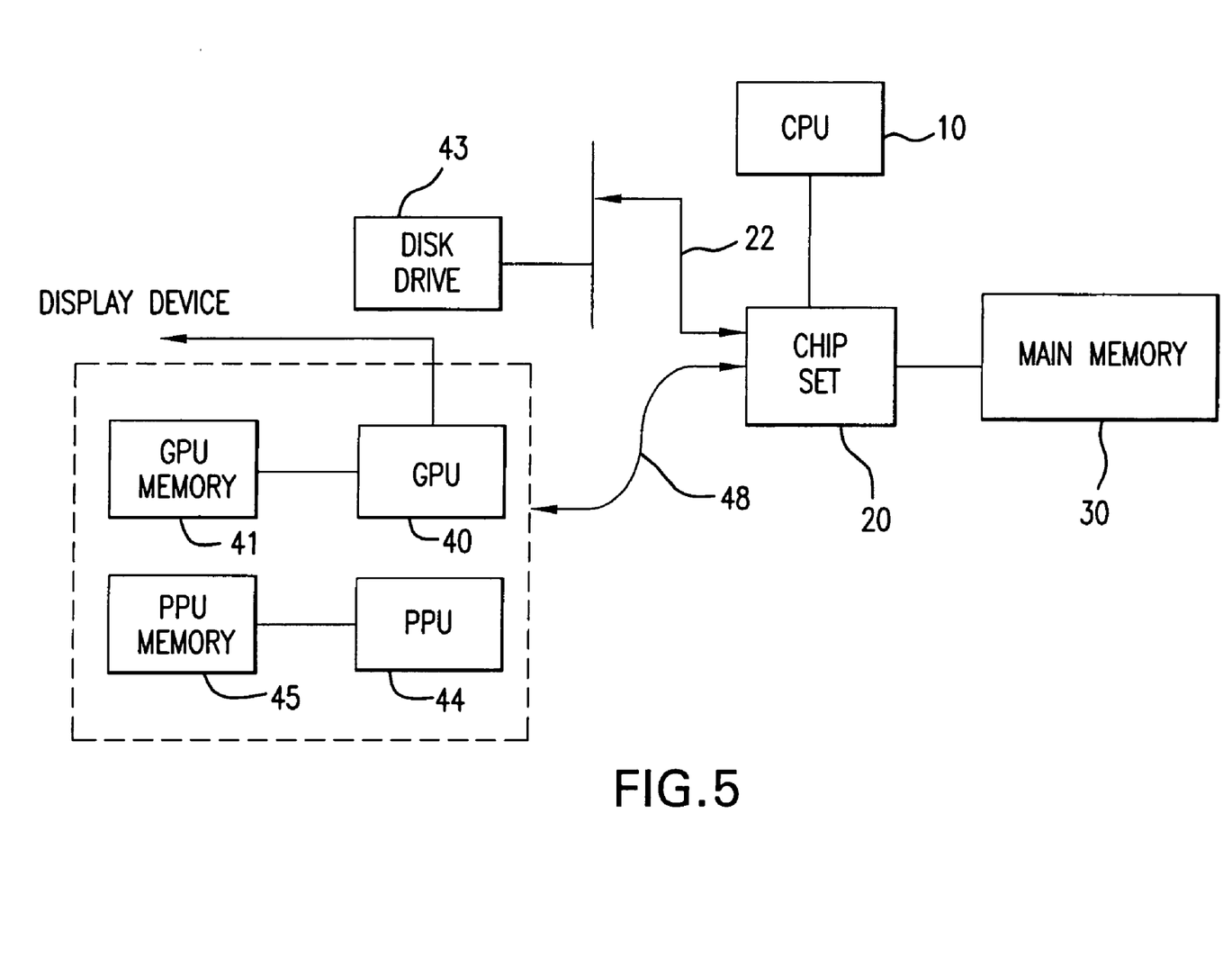

FIG. 5 is yet another exemplary embodiment of the present invention. The system of FIG. 5 is another extension of the system shown in FIG. 1, and recognizes that near term implementations of the present invention will probably rely on the design dictates associated with available local bus architectures. For example, rather than place the GPU and PPU on separate PCI cards, these system elements may be combined on a single PCI card. Indeed, the GPU and PPU may be configured on a single daughterboard to interface with the host system over a single bus, such as an AGP bus. The daughterboard may include separate GPU and PPU memories (41, 45). A memory controller and an "on-daughterboard" data bus (not shown) may be included on the daughterboard to enable data transfers directly between the PPU and GPU memories. Alternatively, the separate GPU and PPU memories may be combined within a unitary memory system associated with the daughterboard.

An exemplary flow of data between system elements will now be described with reference to the system shown in FIG. 2. For purposes of this description, the system of FIG. 2 is assumed to be a PPU-enhanced Personal Computer (PC) running a PC game. Within the system, an integrated circuit chip (e.g., a processor) forming the heart of PPU 44, along with the PPU memory, connectors, power supplies, clock and reset circuitry, and other related elements are mounted on a daughterboard (hereafter "the PPU card") and connected to the PC through a PCI Express interface. Another integrated circuit chip forming the heart of GPU 40 along with the GPU (video) memory, connectors, power supplies, clock and reset circuitry, and other related elements are similarly mounted on another daughterboard (hereafter "the GPU card") and connected to the PC through an AGP interface. The daughterboards may be conventionally connected within the PC using PCI or similar expansion slots. The GPU is also conventionally connected to a display device, such as a CRT monitor, LCD panel, etc.

When executing the PC game using system resources, the CPU essentially runs a game engine, a graphics API, a PPU API, and related device drivers. The game engine comprises game specific software and typically includes packages directed to the implementation of AI, user input (e.g., keyboard, joystick, mouse, etc.) processing, sound processing, scene rendering, and general animation. Animation software manages the playback of artist scripted key-frame animations. The game engine software interpolates motion (e.g., positions and rotations) of object/features between defined key-frames, and blends multiple key-framed sequences as need.

The graphics API provides a standard software interface for the game engine to access the functionality provided by the GPU card. Conventional graphics APIs include D3D (by Microsoft, Inc.) and OpenGL. The device driver software manages communication between the graphics API and the GPU hardware. The animation data typically sent to the GPU through use of the graphics API and related device drivers includes, as examples, vertex buffers, triangle strips, texture maps, and a command stream containing various commands to control the rendering of the scene by the GPU.

Much of the animation data sent to the GPU, especially large data structures such as vertex buffers and texture maps, are generally stored in main memory 30. Main memory 30 often comprises a specialized (i.e., a specifically designated) section called an AGP aperture that enables data transfers from main memory 30 to GPU memory 41.

The physics API provides a software interface for the game engine to access various physics simulation functionality provided by PPU 44. Typical simulation data transferred from the host system to the PPU through the physics API and related PPU device drivers includes: static data, inputs, parameters, updates to persistent state data, and a stream of commands to the PPU. The commands are used to control the physics simulation, or to query various elements of state data. For example, the application running on the host system CPU may need to know the current position, velocity and/or orientation of an object/feature in the simulation. Other commands may instruct the PPU to send, as returned physics data, selected portions of the simulation state data to the host after selected simulation time-steps. In response to these types of commands, the PPU writes physics data, generally via a DMA transfer, from PPU memory 45 to main memory 30. Once stored in main memory 30, the physics data may be accessed by host system components under the direction of the game engine and through the physics API.

Within a PPU-enhanced system, the GPU will typically require access to at least some portion of the simulation state data (e.g., data defining the current position and orientation of a rigid body, or a vertex buffer) stored in PPU memory in order to properly render a scene. Since the physics data to-be-returned may be quite voluminous, and since this data must sometimes be updated in main memory during each animation frame, it is important to transfer the required physics data as quickly as possible. This is true whether the physics data requires additional processing or is ready for immediate consumption by the GPU, as animation data. Where the main memory contains an AGP aperture (or similar designated memory portion), the PPU preferably returns physics data directly to the AGP aperture. Once the PPU-derived animation data is loaded into main memory 30, the CPU can issue a command to the GPU to render the scene using the data in main memory.

Figure 6:
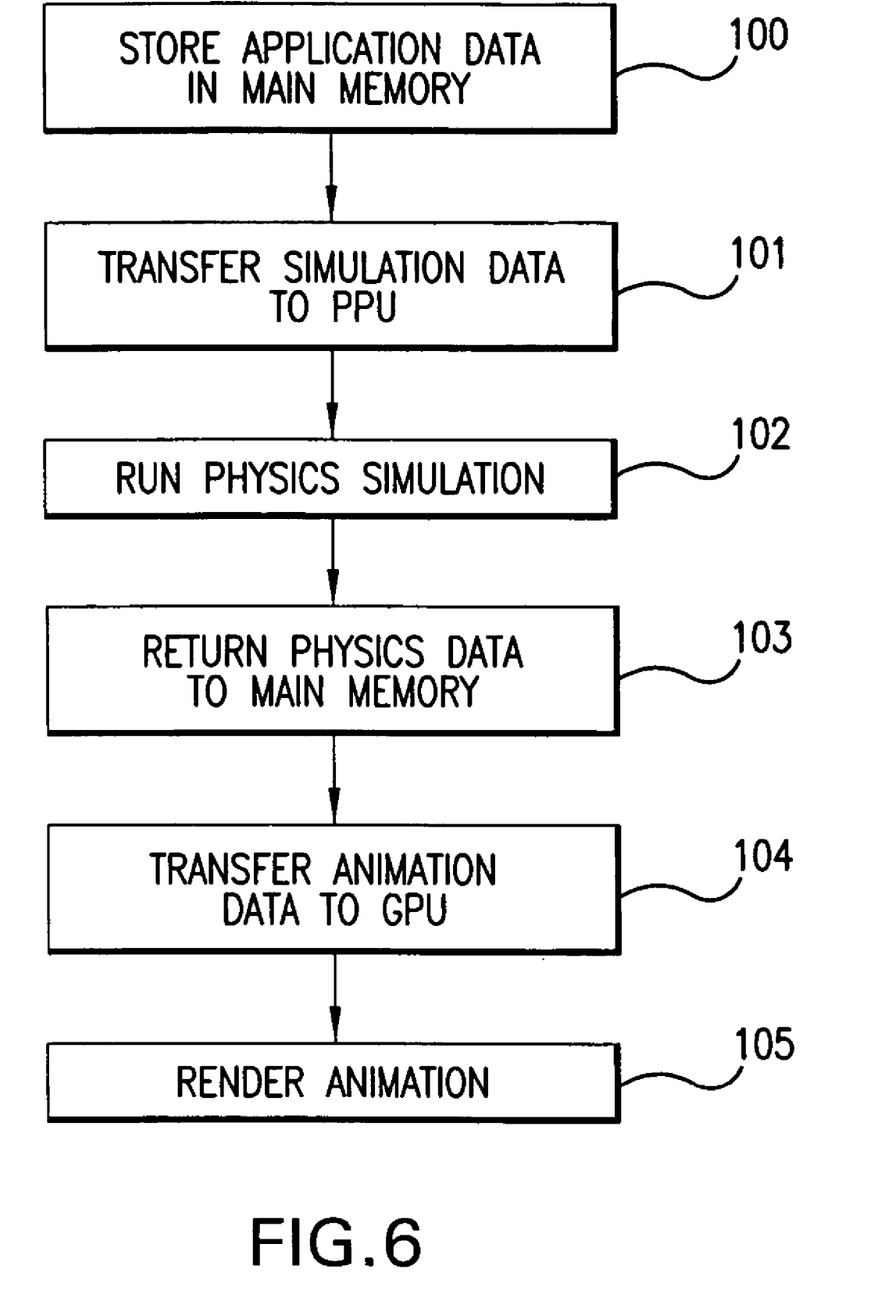

The flowchart shown in FIG. 6 summarizes a general method whereby data flows between the computational elements of a PPU-enhanced system. Following initialization of an application running on the system, the CPU stores application data in main memory (100). This step generally involves retrieving the application data from a peripheral device such as a disk drive or the Internet. Once the application data is stored in main memory, simulation data may be transferred from the main memory to a PPU memory (101). With the simulation data stored in PPU memory, the PPU runs the physics simulation (102). At one or more points during the simulation, physics data is returned to the host system and stored in main memory (103). The physics data may be directly transferred to the GPU memory as animation data or transferred to the main memory as physics data potentially implicated in further processing by the CPU (104). Once received in GPU memory, the animation data may be used to render a scene (105).

Figure 7:
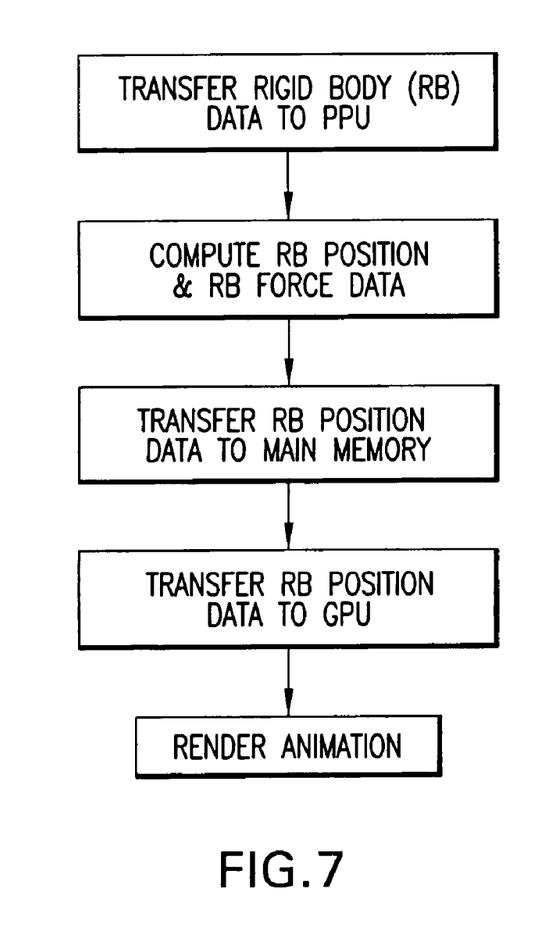
Figure 8:
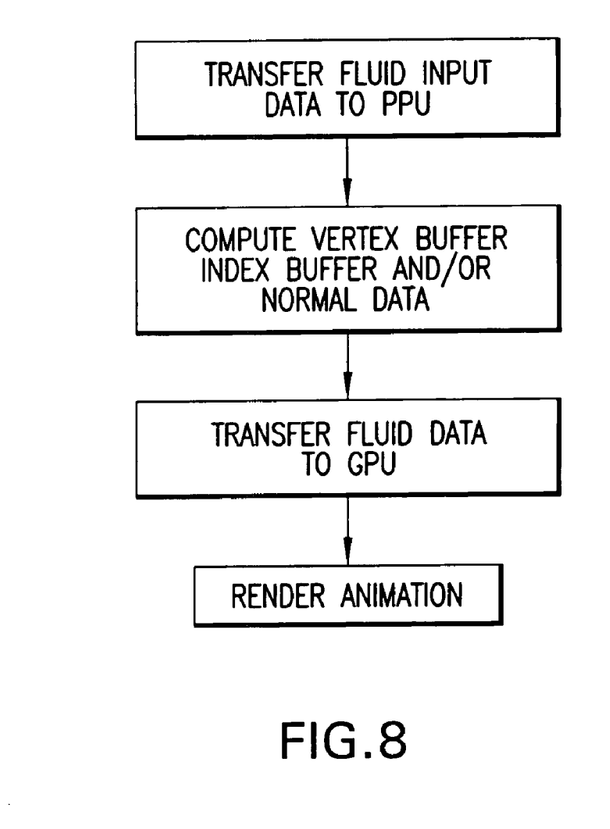

The flowcharts shown in FIGS. 7 and 8 are directed to more specific examples of methods related to the transfer of data between the computational elements of a PPU-enhanced system. The flowchart of FIG. 7 is directed to the animation of one or more rigid bodies within a scene. Data defining the shape, size, and physical properties of the rigid body (hereafter "rigid body data") is typically contained within the application data. For example, the shape of the rigid body may be defined by a mesh data structure characterized by a vertex buffer and an index buffer, or by a simple primitive shape, such as a sphere, a box, or a cylinder. The rigid body data is transferred from the host system to the PPU (201). The rigid body data may be used for multiple purposes within the PPU. For example, the rigid body data is used by physics subroutines running on the PPU to determine the forces (velocities, accelerations, and/or torques) influencing the rigid body, as well as the position and orientation (hereafter "position data") of the rigid body (202). The rigid body position data may subsequently be used by other physics subroutines running on the PPU to determine collisions between the rigid body and other object/features in the scene.

Once the rigid body position data is updated in the PPU memory, it is transferred to the host system (203) where it is made available to the GPU (204) and used to render the rigid body within the scene (205). Of note, the rigid body position data derived by the PPU may be considered either physics data or animation data depending on its nature and the particular data input capabilities of the GPU. For example, where the rigid body position data is expressed as a mesh data structure, it may well be used as animation data suitable for direct consumption by the GPU. Where, however, the rigid body position data is expressed as a primitive, further CPU processing is normally required since conventional GPUs are not adapted to the direct input of such primitive data structures. Even where the rigid body position data is expressed as a mesh data structure otherwise acceptable as an input to the GPU, further CPU processing may be desirable. For example, the CPU may provide a higher resolution mesh for the rigid body and use the PPU-derived translation and rotation data to transform the vertices of the higher resolution mesh.

The flowchart of FIG. 8 is directed to the animation of a fluid object/feature. Rigid bodies come with a defined and unchanging shape and thus the initial data defining the rigid body is typically contained in the application data This is generally not the case with fluids. Rather, the data structure defining a fluid is preferably generated by the PPU from inputs received as part of the application data transferred from the host system (301). The initial position of "particles" forming the fluid, one or more emitter and drain positions and characteristics are example of fluid inputs.

A smooth particle hydrodynamics (SPH) subroutine being run on the PPU computes physics data related to the fluid from the fluid inputs received from the host system (302). For example, the SPH subroutine computes the forces acting on the fluid particles. Taking these forces into account, the (updated) acceleration, velocity, and position for each fluid particle is calculated. Taking the fluid particle position data into account, a mesh data structure is generated to represent the surface of the fluid. The mesh data structure generally consists of an array of vertex position data (the "vertex buffer"), and data identifying the vertices of the triangles forming the mesh (the "index buffer"). The PPU may also compute for each respective vertex, a vector representing the surface normal direction at the vertex (the "normal data").

Taken together, the vertex data, index data, and normal data form "fluid animation data" typically requiring no additional processing by the CPU. As a result, the fluid animation data is transferred to the GPU (303) and used to render the fluid in the scene (304). Transfer of the fluid animation data may occur through the main memory or directly between the PPU memory and the GPU memory.

The fluid animation data may be used for purposes within the PPU. For example, the fluid data may also be used to determine collisions between the fluid and other object/features in the scene.

The foregoing embodiments and related methods are teaching examples of the present invention. Many specific adaptations and modifications may be made to these embodiments. For example, as has been noted above with respect to FIG. 4, the PPU and GPU may ultimately be integrated within the same chip, whether that single processing chip also incorporates the CPU. A combined PPU/GPU chip might well be configured on a single PCI card, thereby reducing the latency of data transfers between these two elements.

As previously noted the GPU and PPU memories shown in FIG. 5 may be combined with separate or integrated PPU/GPU computational units. Whether these memories are combined or not, the GPU may directly read simulation state data from the PPU memory, thereby eliminating the need to copy data to and from the system maim memory. A single PCI card or single chip version of the PPU and GPU could use the "Multifunction AGP Master" feature conventionally provided by AGP architectures to give the impression of a multifunction device.

In sum, many different system architectures may be used to one or more methods rendering an animation on a display device associated with a system. Within these method(s) some (first) portion of the animation data may be generated using CPU resources. While the CPU is generating the first portion of the animation data, the PPU is simultaneously and in parallel, at least in part, generating physics data. The physics data may be, in fact, another (second) portion of the animation data, or it may serve as an input to the CPU generation of the second portion of the animation data.

Whether generated in the CPU, the PPU, or a combination of the CPU and PPU, all portions of the animation data are ultimately stored in memory (e.g., L2 cache, GPU memory and/or main memory) before being rendering using the GPU resources.

A myriad of implementation adaptations and modifications to the working example presented herein will be readily apparent to those of ordinary skill in the art. However, these adaptations and modifications fall within the scope of the present invention which is defined by the attached claims.

What is claimed is:

1. A computing device, comprising:
an L2 cache;
a central processing unit (CPU) coupled to the L2 cache and configured to:
generate application data, and
store the application data in the L2 cache;
a physics processing unit (PPU) coupled to the L2 cache and configured to:
receive the application data from the L2 cache,
perform physics operations on the application data, and
store results of the physics operations in the L2 cache; and
a graphics processing unit (GPU) coupled to the L2 cache and directly
connected to the PPU via a high-bandwidth bus and configured to:
receive the results of the physics operations directly from the PPU via the high-bandwidth bus,
perform graphics operations on the results of the physics operations, and
store the results of the graphics operations in the L2 cache.

2. The computing device of claim 1, further comprising:
a system memory;
a memory controller coupled to the system memory; and
a bus interface coupled to the L2 cache and to the memory controller and configured to:
retrieve first data from the system memory via the memory controller for storage in the L2 cache, and
transmit second data from the L2 cache to the system memory via the memory controller.

3. The computing device of claim 1, wherein the PPU comprises a PPU memory for storing one or more physics subroutines associated with the physics operations.

4. The computing device of claim 3, wherein the PPU is further configured to perform one or more physics operations by executing a sequence of physics subroutines operating on the application data.

5. The computing device of claim 1, wherein the GPU comprises a GPU memory, and the GPU is further configured to store the results of the physics operations received from the PPU in the GPU memory.

6. The computing device of claim 1, wherein the L2 cache is divided into one or more portions, and each of the one or more portions is associated with at least one of the CPU, the PPU, or the GPU.

7. The computing device of claim 1, wherein the computing device further comprises an Input/Output interface, a disk drive, and a chipset, the Input/Output interface coupled to the bus interface and configured to communicate with the disk drive via the chipset.

8. The computing device of claim 1, further comprising a display device coupled to the GPU.

9. The computing device of claim 1, wherein the GPU is further configured to render an animation based on the results of the physics operations and the application data.

10. The computing device of claim 1, wherein the results of the physics operations comprises animation data.

11. The computing device of claim 10, wherein the animation data comprises fluid animation data.

12. The computing device of claim 11, wherein the fluid animation data comprises a vertex buffer, an index buffer, and normal data.

13. A computer-implemented method for rendering an animation sequence, the method comprising:
  retrieving application data from an L2 cache included in a computer system having a central processing unit (CPU), a physics processing unit (PPU), and a graphics processing unit (GPU), wherein the L2 cache is coupled to the CPU, the PPU, and the GPU;
  performing one or more physics operations based on the application data;
  transmitting the results of performing the one or more physics operations to the GPU directly via a high-bandwidth bus directly connecting the PPU and the GPU; and
  rendering the animation sequence based on the results of performing the one or more physics operations and the application data.

14. The method of claim 13, further comprising the step of storing one or more physics subroutines associated with the physics operations in a PPU memory included in the PPU.

15. The method of claim 13, further comprising the step of performing one or more physics operations by executing a sequence of physics subroutines operating on the application data.

16. The method of claim 13, further comprising the step of storing the results of performing the one or more physics operations received from the PPU in a GPU memory included in the GPU.

17. The method of claim 13, wherein the L2 cache is divided into one or more portions, and each of the one or more portions is associated with at least one of the CPU, the PPU, or the GPU.

18. The method of claim 13, further comprising the step of causing the animation sequence to be displayed on a display device coupled to the GPU.

19. The method of claim 13, wherein the results of performing the one or more physics operations comprises animation data.

20. The method of claim 19, wherein the animation data comprises fluid animation data.

21. The method of claim 20, wherein the fluid animation data comprises a vertex buffer, an index buffer, and normal data.

* * * * *